US012485384B2

(12) United States Patent
Kardel et al.

(10) Patent No.: US 12,485,384 B2
(45) Date of Patent: Dec. 2, 2025

(54) PROCESS FOR CONTROLLING HYDROGEN SULFIDE AND AMMONIA FLOW RATES

(71) Applicant: UOP LLC, Des Plaines, IL (US)

(72) Inventors: Cameron Kardel, Chicago, IL (US); Donald Eizenga, Elk Grove Village, IL (US); James W. Harris, Palatine, IL (US); Jan De Ren, Bracknell (GB); Zudtky Wisecarver, Des Plaines, IL (US); Alexander Green, Palatine, IL (US); William J. Whyman, Collinsville, OK (US); Ian Clarke, Reading (GB)

(73) Assignee: UOP LLC, Rosemont, IL (US)

( * ) Notice: Subject to any disclaimer, the term of this patent is extended or adjusted under 35 U.S.C. 154(b) by 773 days.

(21) Appl. No.: 17/842,592

(22) Filed: Jun. 16, 2022

(65) Prior Publication Data
US 2023/0046451 A1 Feb. 16, 2023

Related U.S. Application Data

(60) Provisional application No. 63/232,741, filed on Aug. 13, 2021.

(51) Int. Cl.
*B01D 53/30* (2006.01)
*B01D 53/34* (2006.01)
*B01D 53/58* (2006.01)
*C01C 1/245* (2006.01)
*G05D 11/08* (2006.01)

(52) U.S. Cl.
CPC ........... *B01D 53/30* (2013.01); *B01D 53/346* (2013.01); *B01D 53/58* (2013.01); *C01C 1/245* (2013.01); *G05D 11/08* (2013.01)

(58) Field of Classification Search
CPC ...... B01D 53/30; B01D 53/346; B01D 53/58; B01D 53/52; B01D 53/1468; C01C 1/245; C01C 1/22; C01C 1/242; G05D 11/08; G05D 11/132; C10G 49/00
See application file for complete search history.

(56) References Cited

U.S. PATENT DOCUMENTS

| 6,159,440 A | 12/2000 | Schoubye |
| 6,902,713 B1 * | 6/2005 | Binoist ................. B01D 53/58 |
| | | 423/237 |
| 7,824,652 B1 | 11/2010 | Clarkson |
| 2006/0110304 A1 | 5/2006 | Harada et al. |
| 2008/0050302 A1 | 2/2008 | Anderson |

(Continued)

OTHER PUBLICATIONS

Office Action for corresponding Canadian Application No. 3228699 dated Jan. 28, 2025.

(Continued)

*Primary Examiner* — Brian J. Sines
(74) *Attorney, Agent, or Firm* — Paschall & Associates, LLC; James C. Paschall (57) ABSTRACT

A control process and apparatus provide feed forward control of stoichiometric proportions of hydrogen sulfide and ammonia to a thermal oxidizer and an ammonia scrubber, respectively. To account for unmeasured or uncalculated sulfur feed to the thermal oxidizer, a feed back measurement of sulfur dioxide and ammonia concentration is used to correct the flow rate of hydrogen sulfide to the thermal oxidizer and/or ammonia to the ammonia scrubber.

9 Claims, 2 Drawing Sheets

(56) References Cited

U.S. PATENT DOCUMENTS

| | | |
|---|---|---|
| 2009/0148373 A1 | 6/2009 | Anderson |
| 2019/0152780 A1 | 5/2019 | O'Connell |
| 2021/0062683 A1 | 3/2021 | Kiso |
| 2021/0069636 A1 | 3/2021 | George |
| 2021/0331923 A1* | 10/2021 | Rajchel .................. C01B 17/64 |

OTHER PUBLICATIONS

WIPO International Preliminary Report on Patentability (IPRP) dated Nov. 18, 2022.
Search Report for 22856766.5 dated May 8, 2025.

* cited by examiner

PROCESS FOR CONTROLLING HYDROGEN SULFIDE AND AMMONIA FLOW RATES

CROSS-REFERENCE TO RELATED APPLICATIONS

This application claims priority from U.S. Provisional Application No. 63/232,741, filed Aug. 13, 2021, which is incorporated herein in its entirety.

FIELD

The field is managing gas streams in a facility and particularly controlling the flow of gas streams in a facility.

BACKGROUND

Refineries can include any hydrocarbon processing facility that upgrades hydrocarbon streams into useable streams of greater value. Typically, refineries utilize one or more hydroprocessing units which convert hydrocarbons in the presence of hydroprocessing catalyst and hydrogen to more valuable products.

Hydrotreating is a hydroprocessing process used to remove heteroatoms such as sulfur and nitrogen from hydrocarbon streams, to partially or completely saturate a proportion of the aromatic compounds to meet fuel specifications and to saturate olefinic compounds to meet fuel specifications. Hydrogen sulfide is produced by hydrodesulfurization of organic sulfur in hydrocarbon feedstocks and ammonia is produced by hydrodenitrification of organic nitrogen which are both hydrotreating processes.

Hydrocracking is a hydroprocessing process in which not only some level of hydrotreating takes place but also where hydrocarbons crack in the presence of hydrogen and hydrocracking catalyst to lower molecular weight hydrocarbons. Due to environmental concerns and newly enacted rules and regulations, saleable fuels must meet lower and lower limits on contaminates, such as sulfur and nitrogen. New regulations require essentially complete removal of sulfur from diesel. For example, the ultra-low sulfur diesel (ULSD) requirement is typically less than about 10 wppm sulfur.

Refineries produce hydrogen sulfide and ammonia in large quantities. In the liquid phase, some of the hydrogen sulfide and much of the ammonia collect in sour water streams taken from separator boots that allow aqueous streams to be separated from hydrocarbons streams which are both in liquid phase. Sour water can undergo stripping to concentrate hydrogen sulfide and ammonia in the gas phase while diluting their concentration in the liquid phase which typically is taken to the water treatment plant and/or recycled to a hydroprocessing unit or other units such as a crude desalter.

In the gas phase, hydrogen sulfide and some ammonia are scrubbed from hydrogen-rich streams by absorption into a solvent such as an amine in an acid gas scrubbing column. The solvent, rich in hydrogen sulfide, is regenerated by reboiling it to provide a scrubbed acid gas stream concentrated in hydrogen sulfide.

These waste gas streams rich in hydrogen sulfide and ammonia to a lesser extent may be taken to a sulfur recovery unit (SRU) which typically operates to make elemental sulfur utilizing a two or three-stage Claus process, in some cases combined with an advanced Claus stage for increased sulfur recovery. Alternatively, to an advanced Claus stage, the two- or three-stage Claus process is followed by a clean-up unit. The clean-up unit hydrogenates remaining sulfur compounds to hydrogen sulfide which subsequently is absorbed in an amine solvent, followed by reboiling to regenerate the solvent thereby selectively removing the absorbed hydrogen sulfide. The remaining sulfur compounds can then be recycled to the upstream SRU to be converted to sulfur to increase the overall sulfur recovery.

Sulfur and nitrogen are the essential components of fertilizer for crop production. There is a continuing need for improved methods for cleaning up refinery waste streams and an independent need for producing fertilizer. Controlling these processes is also a necessity for efficiently disposing hydrogen sulfide and ammonia by producing fertilizer.

BRIEF SUMMARY

A process and apparatus for controlling feed rates in a facility comprises determining the molar flow rate of sulfur as hydrogen sulfide charged to a thermal oxidizer and determining the molar flow rate of nitrogen as ammonia charged to an ammonia scrubber. The flow rate of hydrogen sulfide to the thermal oxidizer and the flow rate of ammonia to the ammonia scrubber are controlled to provide a stoichiometric molar ratio for a chemical reaction between ammonia and sulfur dioxide.

A process and apparatus for controlling feed rates in a facility can also comprise determining the molar flow rate of sulfur oxide or ammonia in an overhead stream exiting an ammonia scrubber. Sulfur oxide can include sulfur dioxide and/or sulfur trioxide. The flow rate of hydrogen sulfide in a sour gaseous stream from a sour water stripper column and/or a solvent gaseous stream from an amine regenerator column to a thermal oxidizer can be adjusted and/or the flow rate of ammonia to said ammonia scrubber can be adjusted in response to the determination of the molar flow rate of sulfur oxide or ammonia exiting an ammonia scrubber.

The reaction of sulfur oxide and ammonia can produce fertilizer, such as ammonium sulfate and/or ammonium thiosulfate.

DEFINITIONS

The term "fluid communication" means that material flow is operatively permitted between enumerated components.

The term "downstream fluid communication" means that at least a portion of material flowing to the subject in downstream fluid communication may operatively flow from the object with which it fluidly communicates.

The term "upstream fluid communication" means that at least a portion of the material flowing from the subject in upstream fluid communication may operatively flow to the object with which it fluidly communicates.

The term "signal communication" means that one component in signal communication can transmit and another component in signal communication can receive the signal.

The term "direct fluid communication" means that flow from the upstream component enters the downstream component without passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripping columns may omit a reboiler at a bottom of the column and instead provide heating requirements and separation impetus from a fluidized inert media such as steam.

As used herein, the term "True Boiling Point" (TBP) means a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant", "predominantly" or "predominate" means greater than 50%, suitably greater than 75% and preferably greater than 90%.

As used herein, the term "refinery" means a facility for processing and upgrading hydrocarbon streams including co-processing or processing biorenewable streams.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

DETAILED DESCRIPTION

Hydrogen sulfide in a refinery waste stream can be thermally oxidized to sulfur oxides. Sulfur oxides can be reacted with ammonia to manage the sulfur oxides. In an embodiment, the reaction can produce ammonium sulfate and/or ammonium thiosulfate, a crop fertilizer. The ammonia can be taken from the waste stream, from elsewhere in the refinery or from an outside source. Hydrogen sulfide from a sour water stripper in a refinery will primarily be fed directly to a thermal oxidizer; whereas, a hydrogen sulfide from a solvent regeneration unit will primarily be fed to an SRU. The SRU tail gas and other gaseous effluents will subsequently be fed to the thermal oxidizer for conversion to sulfur oxides. The sulfur oxides can be reacted with ammonia from the refinery or from elsewhere to produce ammonium sulfate and/or ammonium thiosulfate.

The sulfur and nitrogen species within a sulfur utilization unit are molar balanced by a feed-forward control. A combination of hydrogen sulfide analyzers and flow transmitters installed in the main sulfur sources, being the solvent gaseous gas stream from an amine regenerator column and a sour gaseous stream from a sour water stripping column, will enable the computation of the molar flow rate of the sulfur species as hydrogen sulfide. The nitrogen species will be computed in a similar fashion by calculating the flow rate ammonia from an ammonia stripper off-gas stream from the ammonia stripper, an ammonia storage tank and a chemical grade ammonia tank. These flowrates will be molar balanced to generate the fertilizer in a downstream ammonia scrubber.

A sulfur oxide feedback control may also be incorporated into the control to correct the feed forward control to account for the sulfur in the SRU tail gas, sweep air and spent degassing air fed from the SRU to the thermal oxidizer. If molar flow rate of sulfur oxide is higher than desired, less hydrogen sulfide should be sent to the thermal oxidizer or more ammonia should be sent to the ammonia scrubber. If the molar flow rate of sulfur oxide is lower than desired, more hydrogen sulfide should be sent to the thermal oxidizer or less ammonia should be sent to the ammonia scrubber. Similarly, an ammonia feedback control may also be incorporated into the control to correct the feed forward control to account for ammonia diverted from the ammonia scrubber. If molar flow rate of ammonia is higher than desired, less ammonia should be sent to the ammonia scrubber or more hydrogen sulfide should be sent to the thermal oxidizer. If the molar flow rate of ammonia is lower than desired, more ammonia should be sent to the ammonia scrubber or less hydrogen sulfide should be sent to the thermal oxidizer.

Figure 1:
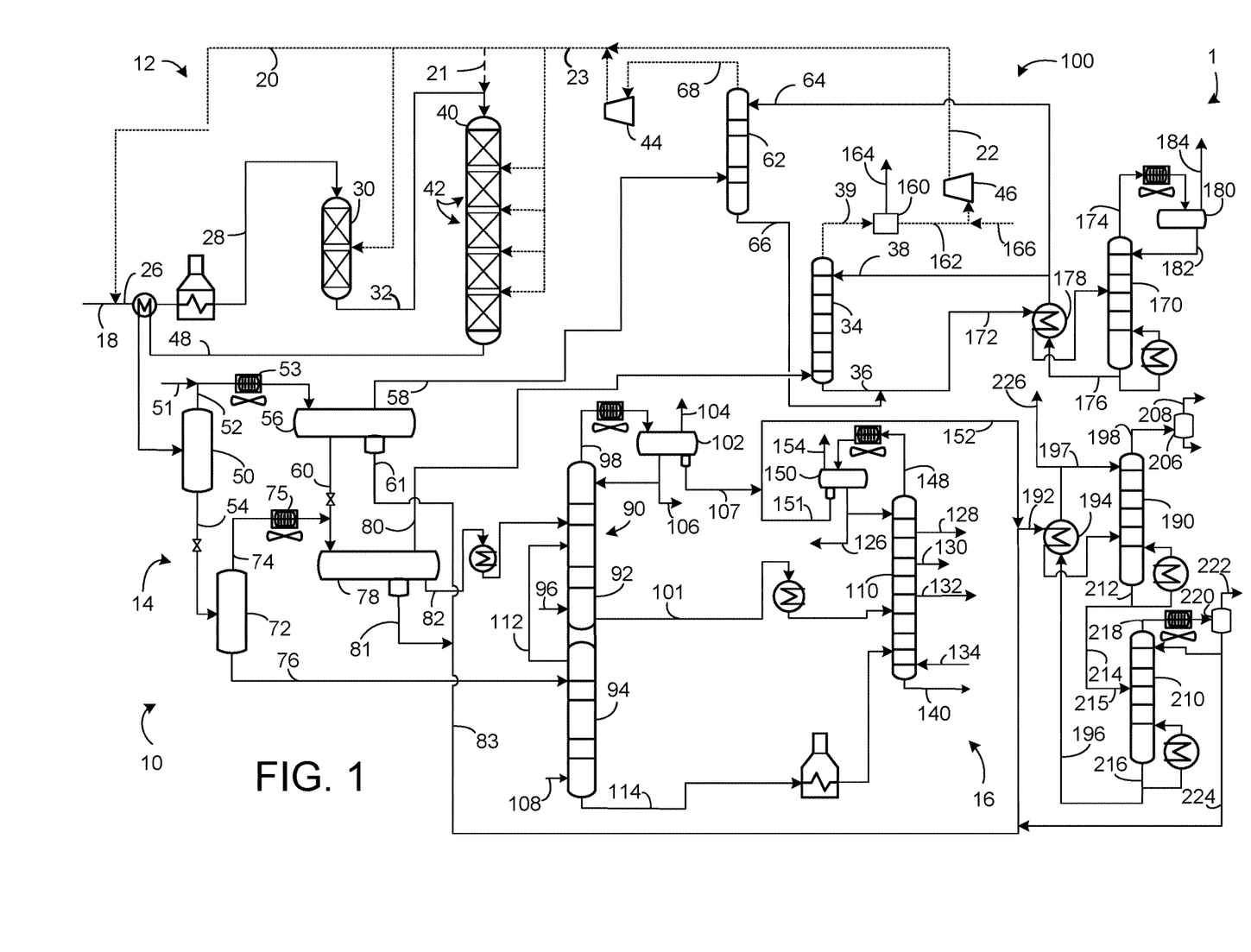
FIG. 1 is a schematic drawing of a refinery.

A part of a refinery 1 is shown in FIG. 1. Dotted lines in FIG. 1 represent a hydrogen gas stream. The refinery 1 may be a facility that comprises a hydroprocessing unit 10 for hydroprocessing hydrocarbons. The hydroprocessing unit 10 comprises a hydroprocessing reactor section 12, a separation section 14, a fractionation section 16 and a hydrogen recovery section 100. A hydrocarbonaceous stream in hydrocarbon line 18 and a hydrogen-rich stream in hydrogen line 20 are fed to the hydroprocessing reactor section 12. Hydroprocessed effluent is separated in the fractionation section 16.

Hydroprocessing that occurs in the hydroprocessing reactor section 12 may be hydrocracking or hydrotreating. Hydrocracking refers to a process in which hydrocarbons crack in the presence of hydrogen to lower molecular weight hydrocarbons. Hydrocracking is the preferred process in the hydroprocessing reactor section 12. Consequently, the term "hydroprocessing" will include the term "hydrocracking" herein. Hydrocracking also includes slurry hydrocracking in which resid feed is mixed with catalyst and hydrogen to make a slurry and cracked to lower boiling products.

Hydroprocessing that occurs in the hydroprocessing reactor section 12 may also be hydrotreating. Hydrotreating is a process wherein hydrogen is contacted with hydrocarbon in the presence of suitable catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Some hydrotreating processes are specifically designed to saturate aromatics. The cloud point of the hydrotreated product may also be reduced. The subject process and apparatus will be described with the hydroprocessing reactor section 12 comprising a hydrotreating reactor 30 and a hydrocracking reactor 40. It should be understood that a hydroprocessing reactor section 12 can comprise either or both the hydrotreating reactor 30 and the hydrocracking reactor 40.

In one aspect, the process and apparatus described herein are particularly useful for hydroprocessing a hydrocarbon feed stream comprising a hydrocarbonaceous feedstock or a biorenewable feedstock. Illustrative hydrocarbonaceous feed stocks particularly for hydroprocessing units having a hydrocracking reactor include hydrocarbon streams having initial boiling points (IBP) above about 288° C. (550° F.), such as atmospheric gas oils, vacuum gas oil (VGO) having T5 and T95 between about 315° C. (600° F.) and about 650° C. (1200° F.), deasphalted oil, coker distillates, straight run distillates, pyrolysis-derived oils, high boiling synthetic oils, cycle oils, clarified slurry oils, deasphalted oil, shale oil, hydrocracked feeds, catalytic cracker distillates, atmospheric residue having an IBP at or above about 343° C. (650° F.) and vacuum residue having an IBP above about 510° C. (950° F.).

The hydrogen stream in the hydrogen line 20 may split off from a hydroprocessing hydrogen line 23. The hydrogen stream in line 20 may be a hydrotreating hydrogen stream. The hydrotreating hydrogen stream may join the hydrocarbonaceous stream in the hydrocarbon line 18 to provide a hydrocarbon feed stream in a hydrocarbon feed line 26. The hydrocarbon feed stream in the hydrocarbon feed line 26 may be heated by heat exchange with a hydrocracked stream in line 48 and in a fired heater. The heated hydrocarbon feed stream in line 28 may be fed to a hydrotreating reactor 30.

The hydrotreating reactor 30 may be a fixed bed reactor that comprises one or more vessels, single or multiple beds of catalyst in each vessel, and various combinations of hydrotreating catalyst in one or more vessels. It is contemplated that the hydrotreating reactor 30 be operated in a continuous liquid phase in which the volume of the liquid hydrocarbon feed is greater than the volume of the hydrogen gas. The hydrotreating reactor 30 may also be operated in a conventional continuous gas phase, a moving bed or a fluidized bed hydrotreating reactor. The hydrotreating reactor 30 may provide conversion per pass of about 10 to about 40 vol %.

The hydrotreating reactor 30 may comprise a guard bed of specialized material for pressure drop mitigation followed by one or more beds of higher quality hydrotreating catalyst. The guard bed filters particulates and picks up contaminants in the hydrocarbon feed stream such as metals like nickel, vanadium, silicon and arsenic which deactivate the catalyst. The guard bed may comprise material similar to the hydrotreating catalyst. Supplemental hydrogen may be added at an interstage location between catalyst beds in the hydrotreating reactor 30.

Suitable hydrotreating catalysts are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present description that more than one type of hydrotreating catalyst be used in the same hydrotreating reactor 30. The Group VIII metal is typically present in an amount ranging from about 2 to about 20 wt %, preferably from about 4 to about 12 wt %. The Group VI metal will typically be present in an amount ranging from about 1 to about 25 wt %, preferably from about 2 to about 25 wt %.

Preferred hydrotreating reaction conditions include a temperature from about 290° C. (550° F.) to about 455° C. (850° F.), suitably 316° C. (600° F.) to about 427° C. (800° F.) and preferably 343° C. (650° F.) to about 399° C. (750° F.), a pressure from about 2.8 MPa (gauge) (400 psig) to about 17.5 MPa (gauge) (2500 psig), a liquid hourly space velocity of the fresh hydrocarbonaceous feedstock from about 0.1 $hr^{-1}$, suitably 0.5 $hr^{-1}$, to about 5 $hr^{-1}$, preferably from about 1.5 to about 4 $hr^{-1}$, and a hydrogen rate of about 84 $Nm^3/m^3$ (500 scf/bbl), to about 1,011 $Nm^3/m^3$ oil (6,000 scf/bbl), preferably about 168 $Nm^3/m^3$ oil (1,000 scf/bbl) to about 1,250 $Nm^3/m^3$ oil (7,500 scf/bbl), with a hydrotreating catalyst or a combination of hydrotreating catalysts.

The hydrocarbon feed stream in the hydrocarbon feed line 28 may be hydrotreated with the hydrotreating hydrogen stream from hydrotreating hydrogen line 20 over the hydrotreating catalyst in the hydrotreating reactor 30 to provide a hydrotreated hydrocarbon stream that exits the hydrotreating reactor 30 in a hydrotreated effluent line 32. The hydrotreated effluent stream may be forwarded to the separation section 14 or be taken as a hydrocracking feed stream. The hydrogen gas laden with ammonia and hydrogen sulfide may be removed from the hydrocracking feed stream in a separator, but the hydrocracking feed stream is typically fed directly to the hydrocracking reactor 40 without separation. The hydrocracking feed stream may be mixed with a hydrocracking hydrogen stream in a hydrocracking hydrogen line 21 taken from the hydroprocessing hydrogen line 23 and be fed through an inlet to the hydrocracking reactor 40 to be hydrocracked.

Hydrocracking is a process in which hydrocarbons crack in the presence of hydrogen to lower molecular weight hydrocarbons. The hydrocracking reactor 40 may be a fixed bed reactor that comprises one or more vessels, single or multiple catalyst beds 42 in each vessel, and various combinations of hydrotreating catalyst and/or hydrocracking catalyst in one or more vessels. It is contemplated that the hydrocracking reactor 40 be operated in a continuous liquid phase in which the volume of the liquid hydrocarbon feed is greater than the volume of the hydrogen gas. The hydrocracking reactor 40 may also be operated in a conventional continuous gas phase, a moving bed or a fluidized bed hydroprocessing reactor. The term "hydroprocessing" will include the term "hydrocracking" herein.

The hydrocracking reactor 40 comprises a plurality of hydrocracking catalyst beds 42. If the hydrocracking reactor section 12 does not include a hydrotreating reactor 30, the catalyst beds 42 in the hydrocracking reactor 40 may include a hydrotreating catalyst for the purpose of saturating, demetallizing, desulfurizing or denitrogenating the hydrocarbon feed stream before it is hydrocracked with the hydrocracking catalyst in subsequent vessels or catalyst beds 42 in the hydrocracking reactor 40.

The hydrotreated hydrocarbon feed stream is hydroprocessed over a hydroprocessing catalyst in a hydroprocessing reactor in the presence of a hydrocracking hydrogen stream from a hydrocracking hydrogen line 21 to provide a hydroprocessed effluent stream. Specifically, the hydrotreated hydrocarbon feed stream is hydrocracked over a hydrocracking catalyst in the hydrocracking reactor 40 in the presence of the hydrocracking hydrogen stream from a hydrocracking hydrogen line 21 to provide a hydrocracked effluent stream. A hydrogen manifold may deliver supplemental hydrogen streams to one, some or each of the catalyst beds 42. In an aspect, the supplemental hydrogen is added to each of the hydrocracking catalyst beds 42 at an interstage location between adjacent beds, so supplemental hydrogen is mixed with hydroprocessed effluent exiting from the upstream catalyst bed 42 before entering the downstream catalyst bed 42.

The hydrocracking reactor may provide a total conversion of at least about 20 vol % and typically greater than about 60 vol % of the hydrotreated hydrocarbon stream in the hydrotreated effluent line 32 to products boiling below the cut point of the heaviest desired product which is typically diesel. The hydrocracking reactor 40 may operate at partial conversion of more than about 30 vol % or full conversion of at least about 90 vol % of the feed based on total conversion. The hydrocracking reactor 40 may be operated at mild hydrocracking conditions which will provide about 20 to about 60 vol %, preferably about 20 to about 50 vol %, total conversion of the hydrocarbon feed stream to product boiling below the diesel cut point.

The hydrocracking catalyst may utilize amorphous silica-alumina bases or low-level zeolite bases combined with one or more Group VIII or Group VIB metal hydrogenating components if mild hydrocracking is desired to produce a balance of middle distillate and gasoline. In another aspect, when middle distillate is significantly preferred in the converted product over gasoline production, partial or full hydrocracking may be performed in the hydrocracking reactor 40 with a catalyst which comprises, in general, any crystalline zeolite cracking base upon which is deposited a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms. It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8 and 12 Angstroms, wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,100,006.

Mixed polyvalent metal-hydrogen zeolites may be prepared by ion-exchanging with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 wt %, and preferably at least about 20 wt %, metal-cation-deficient, based on the initial ion-exchange capacity. In another aspect, a desirable and stable class of zeolites is one wherein at least about 20 wt % of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 wt % and about 30 wt % may be used. In the case of the noble metals, it is normally preferred to use about 0.05 to about 2 wt % noble metal.

The method for incorporating the hydrogenation metal is to contact the base material with an aqueous solution of a suitable compound of the desired metal wherein the metal is present in a cationic form. Following addition of the selected hydrogenation metal or metals, the resulting catalyst powder is then filtered, dried, pelleted with added lubricants, binders or the like if desired, and calcined in air at temperatures of, e.g., about 371° C. (700° F.) to about 648° C. (1224° F.) in order to activate the catalyst and decompose ammonium ions. Alternatively, the base component may be pelleted, followed by the addition of the hydrogenation component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt %. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,178.

By one approach, the hydrocracking conditions may include a temperature from about 290° C. (550° F.) to about 468° C. (875° F.), preferably 343° C. (650° F.) to about 445° C. (833° F.), a pressure from about 4.8 MPa (gauge) (700 psig) to about 20.7 MPa (gauge) (3000 psig), a liquid hourly space velocity (LHSV) from about 0.4 to less than about 2.5 $hr^{-1}$ and a hydrogen rate of about 421 $Nm^3/m^3$ (2,500 scf/bbl) to about 2,527 $Nm^3/m^3$ oil (15,000 scf/bbl). If mild hydrocracking is desired, conditions may include a temperature from about 35° C. (600° F.) to about 441° C. (825° F.), a pressure from about 5.5 MPa (gauge) (800 psig) to about 3.8 MPa (gauge) (2000 psig) or more typically about 6.9 MPa (gauge) (1000 psig) to about 11.0 MPa (gauge) (1600 psig), a liquid hourly space velocity (LHSV) from about 0.5 to about 2 $hr^{-1}$ and preferably about 0.7 to about 1.5 $hr^{-1}$ and a hydrogen rate of about 421 $Nm^3/m^3$ oil (2,500 scf/bbl) to about 1,685 $Nm^3/m^3$ oil (10,000 scf/bbl).

The hydroprocessed effluent stream may exit the hydrocracking reactor 40 in the hydrocracked effluent line 48 and be separated in the separation section 14 in downstream communication with the hydroprocessing reactor comprising the hydrotreating reactor 30 and/or the hydrocracking reactor 40. The separation section 14 comprises one or more separators in downstream communication with the hydroprocessing reactor comprising the hydrotreating reactor 30 and/or the hydrocracking reactor 40. The hydrocracked effluent stream in the hydrocracked line 48 may in an aspect be heat exchanged with the hydrocarbon feed stream in the hydrocarbon feed line 26 and be delivered to a hot separator 50.

The hot separator 50 separates the hydroprocessed effluent stream to provide a hydrocarbonaceous, hot vapor stream in a hot overhead line 52 extending from a top of the hot separator 50 and a hydrocarbonaceous, hot liquid stream in a hot bottoms line 54 extending from a bottom of the hot separator 50. The hot separator 50 may be in downstream communication with the hydroprocessing reactor comprising the hydrotreating reactor 30 and/or the hydrocracking reactor 40. The hot separator 50 operates at about 77° C. (350° F.) to about 371° C. (700° F.) and preferably operates at about 232° C. (450° F.) to about 315° C. (600° F.). The hot separator 50 may be operated at a slightly lower pressure than the hydrocracking reactor 40 accounting for pressure drop through intervening equipment. The hot separator 50 may be operated at pressures between about 3.4 MPa (gauge) (493 psig) and about 20.4 MPa (gauge) (2960 psig). The hydrocarbonaceous, hot vapor stream taken in the hot overhead line 52 may have a temperature of the operating temperature of the hot separator 50.

The hot vapor stream in the hot overhead line 52 may be cooled with an air cooler 53 before entering a cold separator 56. As a consequence of the reactions taking place in the hydrocracking reactor 40 wherein nitrogen, chlorine and sulfur are reacted from the hydrocarbons in the feed, ammonia, hydrogen sulfide and hydrogen chloride are formed. At a characteristic sublimation temperature, ammonia and hydrogen sulfide will combine to form ammonium bisulfide, and ammonia and hydrogen chloride will combine to form ammonium chloride. Each compound has a characteristic sublimation temperature that may allow the compound to coat equipment, particularly heat exchange equipment, impairing its performance. To prevent such deposition of ammonium bisulfide or ammonium chloride salts in the hot overhead line 52 transporting the hot vapor stream, a suitable amount of wash water may be introduced into the hot overhead line 52 upstream of the air cooler 53 by water line 51 at a point in the hot overhead line where the temperature is above the characteristic sublimation temperature of these compounds.

The hot vapor stream may be separated in the cold separator 56 to provide a cold vapor stream comprising a hydrogen-rich gas stream in a cold overhead line 58 extending from a top of the cold separator 56 and a cold liquid stream in a cold bottoms line 60 extending from a bottom of the cold separator 56. The cold separator 56 serves to separate hydrogen rich gas from hydrocarbon liquid in the hydroprocessed stream for recycle to the reactor section 12 in the cold overhead line 58. The cold separator 56, therefore, is in downstream communication with the hot overhead line 52 of the hot separator 50 and the hydroprocessing reactor comprising the hydrotreating reactor 30 and/or the hydrocracking reactor 40. The cold separator 56 may be operated at about 100° F. (38° C.) to about 150° F. (66° C.), suitably about 115° F. (46° C.) to about 145° F. (63° C.), and just below the pressure of the hydroprocessing reactor comprising the hydrotreating reactor 30 and/or the hydrocracking reactor 40 and the hot separator 50 accounting for pressure drop through intervening equipment to keep hydrogen and light gases in the overhead and normally liquid hydrocarbons in the bottoms. The cold separator 56 may be operated at pressures between about 3 MPa (gauge) (435 psig) and about 20 MPa (gauge) (2,900 psig). The cold separator 56 may also have a boot for collecting a sour water stream in line 61 comprising the salts previously mentioned and aqueous hydrogen sulfide and ammonia. The cold liquid stream in the cold bottoms line 60 may have a temperature of the operating temperature of the cold separator 56.

The cold vapor stream in the cold overhead line 58 is rich in hydrogen but includes hydrogen sulfide and ammonia. Thus, hydrogen can be recovered from the cold vapor stream if these gases are removed. The cold vapor stream in the cold overhead line 58 may be passed through a trayed or packed recycle scrubbing column 62 where it is scrubbed by means of a recycle solvent liquid such as an aqueous solution fed by a recycle solvent line 64 to remove acid gases including hydrogen sulfide by extracting them into the aqueous solution. Preferred recycle solvent liquids include Selexol available from UOP LLC in Des Plaines, Ill. and amines such as alkanolamines including diethanol amine (DEA), monoethanol amine (MEA), methyl diethanol amine (MDEA), diisopropanol amine (DIPA), and diglycol amine (DGA). Other amines can be used in place of or in addition to the preferred amines. The lean amine contacts the cold vapor stream and absorbs acid gas contaminants such as hydrogen sulfide and carbon dioxide. The resultant "sweetened" cold vapor stream is taken out from an overhead outlet of the recycle scrubber column 62 in a recycle scrubber overhead line 68, and a rich solvent stream comprising acid gases is taken out from the bottoms at a bottom outlet of the recycle scrubber column in a recycle scrubber bottoms line 66. The rich recycle solvent stream from the recycle scrubber bottoms may be forwarded to the solvent regenerator 170 to be regenerated and recycled back to the recycle scrubbing column 62 in the recycle solvent line 64. The scrubbed hydrogen-rich stream emerges from the scrubber via the recycle scrubber overhead line 68 and may be compressed in a recycle compressor 44. The scrubbed hydrogen-rich stream in the scrubber overhead line 68 may be supplemented with make-up hydrogen stream in the make-up line 22 upstream or downstream of the compressor 44. The compressed hydrogen stream supplies hydrogen to the hydrogen stream in the hydrogen line 23. The recycle scrubbing column 62 may be operated with a gas inlet temperature between about 38° C. (100° F.) and about 66° C. (150° F.) and an overhead pressure of about 3 MPa (gauge) (435 psig) to about 20 MPa (gauge) (2900 psig). The recycle scrubbing column 62 may be operated at a temperature of about 40° C. (104° F.) to about 125° C. (257° F.) and a pressure of about 1200 to about 1600 kPa. The temperature of the hot vapor stream to the recycle scrubbing column 62 may be between about 20° C. (68° F.) and about 80° C. (176° F.) and the temperature of the scrubbing extraction liquid stream in the solvent line 64 may be between about 20° C. (68° F.) and about 70° C. (158° F.).

The hydrocarbonaceous hot liquid stream in the hot bottoms line 54 comprises a substantial hydrogen concentration. The hot liquid stream may be let down in pressure fed to a hot flash drum 72 to provide a hot flash vapor stream of light ends and hydrogen in a hot flash overhead line 74 extending from a top of the hot flash drum 72 and a hot flash liquid stream in a hot flash bottoms line 76 extending from a bottom of the hot flash drum. In an aspect, light gases such as hydrogen sulfide may be stripped from the hot flash liquid stream in the hot flash bottoms line 76. Accordingly, a product stripping column 90 may be in direct, downstream communication with the hot flash drum 72 and the hot flash bottoms line 76.

The hot flash drum 72 may be operated at the same temperature as the hot separator 50 but at a lower pressure of between about 1.4 MPa (gauge) (200 psig) and about 6.9 MPa (gauge) (1000 psig), suitably no more than about 3.8 MPa (gauge) (550 psig). The hot flash liquid stream taken in the hot flash bottoms line 76 may have a temperature of the operating temperature of the hot flash drum 72.

In an aspect, the cold liquid stream in the cold bottoms line 60 may be let down in pressure and flashed in a cold flash drum 78 to separate the cold liquid stream in the cold bottoms line 60. The cold flash drum 78 may be in direct, downstream communication with the cold bottoms line 60 of the cold separator 56 and in downstream communication with the hydroprocessing reactor comprising the hydrotreating reactor 30 and/or the hydrocracking reactor 40. The cold flash drum 78 may separate the cold liquid stream in the cold bottoms line 60 to provide a cold flash vapor stream in a cold flash overhead line 80 extending from a top of the cold flash drum 78 and a cold flash liquid stream in a cold flash bottoms line 82 extending from a bottom of the cold flash drum. In an aspect, light gases such as hydrogen sulfide may be stripped from the cold flash liquid stream in the cold flash bottoms line 82. Accordingly, a product stripping column 90 may be in downstream communication with the cold flash drum 78 and the cold flash bottoms line 82.

The cold flash drum 78 may be in downstream communication with the cold bottoms line 60 of the cold separator 56 and the hydroprocessing reactor comprising the hydrotreating reactor 30 and/or the hydrocracking reactor 40. The cold flash drum 78 may be operated at the same temperature as the cold separator 56 but typically at a lower pressure of between about 1.4 MPa (gauge) (200 psig) and about 6.9 MPa (gauge) (1000 psig) and preferably between about 2.4 MPa (gauge) (350 psig) and about 3.8 MPa (gauge) (550 psig). A flashed aqueous stream may be removed in a cold flash aqueous line 81 from a boot in the cold flash drum 78 comprising hydrogen sulfide and ammonia. The cold flash liquid stream in the cold flash bottoms line 82 may have the same temperature as the operating temperature of the cold flash drum 78. The cold flash vapor stream in the cold flash overhead line 80 contains substantial hydrogen that may be recovered.

The hot flash vapor stream may be cooled in the cooler 75 and fed to the cold flash drum 78 to be flashed with the cold liquid stream in the cold bottoms line 60. In an aspect, the cold bottoms line 60 may be joined by the hot flash overhead line 74 and receive the cooled hot flash vapor stream in which the cold bottoms line 60 delivers both streams, the cooled, hot flash vapor stream and the cold liquid stream, to the cold flash drum 78. The cold flash drum 78 may be in downstream communication with the hot flash overhead line 74 of the hot flash stripper 72.

The cold flash vapor stream in the cold flash overhead line 80 is rich in hydrogen which may be recovered in a hydrogen recovery section 100. The cold flash vapor stream comprises hydrogen from the hot flash vapor stream in the hot flash overhead line 74. The cold flash vapor stream in the cold flash overhead line 80 may be passed through the trayed or packed cold gas scrubbing column 34. The cold gas scrubbing column 34 may be in downstream communication with the hot flash overhead line 74 and the cold flash overhead line 80. The cold flash vapor stream in the cold flash overhead line 80 may be fed to a lower portion of the cold gas scrubbing column 34. The cold flash vapor stream is scrubbed by means of a cold solvent liquid stream such as an aqueous solution fed by a cold solvent line 38 to remove acid gases including hydrogen sulfide and carbon dioxide by extracting them into the aqueous solution. Preferred extraction liquids include Selexol available from UOP LLC in Des Plaines, Illinois and amines such as alkanolamines including diethanol amine (DEA), monoethanol amine (MEA), methyl diethanol amine (MDEA), diisopropanol amine (DIPA), and diglycol amine (DGA). Other amines can be used in place of or in addition to the preferred amines. The lean cold solvent contacts the cold vapor stream and absorbs acid gas contaminants such as hydrogen sulfide. The resultant "sweetened" scrubbed vapor stream is taken out from an overhead outlet of the cold gas scrubbing column 34 in a scrubber overhead line 39, and a rich off-gas solvent stream rich in acid gas is taken out from the bottoms at a bottom outlet of the cold gas scrubbing column 34 in an off-gas scrubber bottoms line 36. The rich scrubbing cold solvent from the bottoms may be regenerated in a solvent regenerator column 170 and recycled back to the cold scrubbing column 34 in the off-gas solvent line 38.

The scrubbed hydrogen-rich vapor stream emerges from the cold gas scrubber column 170 via the cold scrubber overhead line 39 and may be routed to a pressure swing adsorption (PSA) unit 160 to yield a high purity hydrogen rich stream 162 and a tail gas stream in line 164. The tail gas stream in line 164 may be taken at lower pressure to ensure greater recovery of hydrogen in the high purity hydrogen rich stream 162. The high purity hydrogen stream 162 may combine with additional hydrogen rich makeup gas 166 and may be compressed in a make-up compressor 46. The low hydrogen purity stream 164 comprises the majority of the non-hydrogen compounds in the scrubbed hydrogen-rich vapor stream in the scrubber overhead line 39. The low hydrogen purity tail gas stream 164 may be routed to a thermal oxidizer 320 in the sulfur utilization section 300 of FIG. 2 to be used as fuel gas for combustion therein. The compressed stream from the make-up compressor 46 may provide make-up hydrogen gas in line 22 to the hydroprocessing reactor section 12. The cold gas scrubbing column 34 may be operated at a temperature of about 40° C. (104° F.) to about 125° C. (257° F.) and a pressure of about 1200 to about 1700 kPa. The temperature of the cold flash overhead stream 80 to the cold gas scrubbing column 34 may be between about 20° C. (68° F.) and about 80° C. (176° F.) and the temperature of the cold solvent liquid stream in the cold solvent line 38 may be between about 25° C. (77° F.) and about 75° C. (185° F.).

The fractionation section 16 may include the stripping column 90 and a fractionation column 110. The stripping column 90 may be in downstream communication with a separator 50, 72, 56, 78 or a bottoms line in the separation section 14 for stripping volatiles from a hydrocracked stream. For example, the stripping column 90 may be in downstream communication with the hot bottoms line 54, the hot flash bottoms line 76, the cold bottoms line 60 and/or the cold flash bottoms line 82. In an aspect, the stripping column 90 may be a vessel that contains a cold stripping column 92 and a hot stripping column 94 with a wall that isolates each of the stripping columns from the other. The cold stripping column 92 may be in downstream communication with the hydroprocessing reactor comprising the hydrotreating reactor 30 and/or the hydrocracking reactor 40, the cold bottoms line 60 and, in an aspect, the cold flash bottoms line 82 for stripping the cold liquid stream. The hot stripping column 94 may be in downstream communication with the hydroprocessing reactor section 12 comprising the hydrotreating reactor 30 and/or the hydrocracking reactor 40 and the hot bottoms line 54 and, in an aspect, the hot flash bottoms line 76 for stripping a hot liquid stream which is hotter than the cold liquid stream. The hot liquid stream may be hotter than the cold liquid stream, by at least 25° C. and preferably at least 50° C.

The cold flash liquid stream comprising the hydrocracked stream in the cold flash bottoms line 82 may be heated and fed to the cold stripping column 92 at an inlet which may be in a top half of the column. The cold flash liquid stream which comprises the hydrocracked stream may be stripped of gases in the cold stripping column 92 with a cold stripping media which is an inert gas such as steam from a cold stripping media line 96 to provide a cold stripper vapor stream of naphtha, hydrogen, hydrogen sulfide, steam and other gases in a cold stripper overhead line 98 and a liquid cold stripped stream in a cold stripper bottoms line 101. The cold stripper vapor stream in the cold stripper overhead line 98 may be condensed and separated in a receiver 102. An overhead line 104 from the receiver 102 carries a net stripper off gas stream of LPG, light hydrocarbons, hydrogen sulfide and hydrogen.

Unstabilized liquid naphtha from the bottoms of the receiver 102 may be split between a reflux portion refluxed to the top of the cold stripping column 92 and a liquid stripper overhead stream which may be transported in a condensed stripper overhead line 106 to further recovery or processing. A stripper sour water stream may be collected from a boot of the overhead receiver 102 in a stripper sour water line 107.

The cold stripping column 92 may be operated with a bottoms temperature between about 150° C. (300° F.) and about 288° C. (550° F.), preferably no more than about 260° C. (500° F.), and an overhead pressure of about 0.7 MPa (gauge) (100 psig), preferably no less than about 0.34 MPa (gauge) (50 psig), to no more than about 2.0 MPa (gauge) (290 psig). The temperature in the overhead receiver 102 ranges from about 38° C. (100° F.) to about 66° C. (150° F.) and the pressure is essentially the same as in the overhead of the cold stripping column 92.

The cold stripped stream in the cold stripper bottoms line 101 may comprise predominantly naphtha and kerosene boiling materials. The cold stripped stream in line 101 may be heated and fed to the product fractionation column 110. The product fractionation column 110 may be in downstream communication with the hydroprocessing reactor section 12 comprising the hydrotreating reactor 30 and/or the hydrocracking reactor 40, the cold stripper bottoms line 101 of the cold stripping column 92 and the stripping column 90. The product fractionation column 110 may be in downstream communication with one, some or all of the hot separator 50, the cold separator 56, the hot flash drum 72 and the cold flash drum 78.

The hot flash liquid stream comprising a hydroprocessed stream in the hot flash bottoms line 76 may be fed to the hot stripping column 94 near a top thereof. The hot flash liquid stream may be stripped in the hot stripping column 94 of gases with a hot stripping media which is an inert gas such as steam from a line 108 to provide a hot stripper overhead stream of naphtha, hydrogen, hydrogen sulfide, steam and other gases in a hot stripper overhead line 112 and a liquid hot stripped stream in a hot stripper bottoms line 114. The hot stripper overhead line 112 may be condensed and a portion refluxed to the hot stripping column 92. However, in an embodiment, the hot stripper overhead stream in the hot stripper overhead line 112 from the overhead of the hot stripping column 94 may be fed into the cold stripping column 92 directly in an aspect without condensing or refluxing. The inlet for the cold flash bottoms line 82 carrying the cold flash liquid stream may be at a higher elevation than the inlet for the hot stripper overhead line 112. The hot stripping column 94 may be operated with a bottoms temperature between about 160° C. (320° F.) and about 360° C. (680° F.) and an overhead pressure of about 0.7 MPa (gauge) (100 psig), preferably no less than about 0.34 MPa (gauge) (50 psig), to no more than about 2.0 MPa (gauge) (290 psig).

At least a portion of the hot stripped stream comprising a hydroprocessed effluent stream in the hot stripped bottoms line 114 may be heated and fed to the product fractionation column 110. The product fractionation column 110 may be in downstream communication with the hot stripped bottoms line 114 of the hot stripping column 94. The hot stripped stream in line 114 may be at a hotter temperature than the cold stripped stream in the cold stripped bottoms line 101.

The product fractionation column 110 may be in downstream communication with the hot stripping column 94 and may comprise more than one fractionation column for separating stripped hydroprocessed streams into product streams. The product fractionation column 110 may also be in downstream communication with the hot separator 50, the cold separator 56, the hot flash drum 72, and the cold flash drum 78. The product fractionation column 110 may fractionate hydrocracked streams, the cold stripped stream, and the hot stripped stream by means of an inert stripping gas stream fed from stripping line 134. The product streams from the product fractionation column 110 may include a net fractionated overhead stream comprising naphtha in a net overhead line 126, an optional heavy naphtha stream in line 128 from a side cut outlet, a kerosene stream carried in line 130 from a side cut outlet and a diesel stream in diesel line 132 from a side outlet.

An unconverted oil (UCO) stream boiling above the diesel cut point may be taken in a fractionator bottoms line 140 from a bottom of the product fractionation column 110. A portion or all of the UCO stream in the fractionator bottoms line 140 may be purged from the process, recycled to the hydrocracking reactor 40 or forwarded to a second stage hydrocracking reactor (not shown).

Product streams may also be stripped to remove light materials to meet product purity requirements. A fractionated overhead stream in an overhead line 148 may be condensed and separated in a receiver 150 with a portion of the condensed liquid being refluxed back to the product fractionation column 110. A fractionated overhead sour water stream may be taken in line 151. The net fractionated overhead stream in line 126 may be further processed or recovered as naphtha product. The product fractionation column 110 may be operated with a bottoms temperature between about 260° C. (500° F.) and about 385° C. (725° F.), preferably at no more than about 380° C. (715° F.), and at an overhead pressure between about 7 kPa (gauge) (1 psig) and about 69 kPa (gauge) (10 psig). A portion of the UCO stream in the fractionator bottoms line 140 may be reboiled and returned to the product fractionation column 110 instead of adding an inert stripping media stream such as steam in line 134 to heat to the product fractionation column 110. An overhead line 154 from the receiver 150 carries a net fractionator off gas of LPG and light hydrocarbons.

The cold gas solvent stream in line 36 and the rich recycle solvent stream in line 66 may be combined in a common rich solvent stream in a common rich solvent line 172 to be delivered to a common solvent regenerator column 170. The rich solvent streams are rich in acid gases and must be stripped of acid gases. Other acid gases from the refinery 1 may also be combined in the common rich solvent line 172.

The common rich solvent stream in line 172 is heat exchanged with a common lean solvent stream in line 176 in a solvent regenerator heat exchanger 178. The heated common rich solvent stream in line 172 is fed to the common solvent regenerator 170 in which it is stripped by reboiling to produce the lean solvent stream in line 176. The lean solvent stream in line 176 is cooled by heat exchange with the common rich solvent in line 172 and split between the recycle solvent in line 64 and the cold gas solvent in line 38. An overhead acid gas stream is produced in a solvent regenerator overhead line 174 which is cooled and separated in a solvent regenerator overhead receiver 180. A liquid reflux stream in a bottoms line 182 is refluxed back to the solvent regenerator column 170 and a solvent gaseous stream concentrated in hydrogen sulfide is taken in a vapor solvent overhead line 184. The solvent gaseous hydrogen sulfide stream in line 184 is dilute in ammonia with less than 1 wt % ammonia and is transported to a sulfur recovery unit (SRU) 310 and/or a thermal oxidizer 320 of the sulfur utilization section 300 in FIG. 2. The solvent regenerator column 170 may be operated with a bottoms temperature between about 250° C. (482° F.) and about 385° C. (725° F.), and at an overhead pressure between about 7 kPa (gauge) (1 psig) and about 69 kPa (gauge) (10 psig).

The cold separator sour water stream in line 61 from the cold separator 56 and the cold flash sour water stream in line 81 from the cold flash drum may be combined in line 83. An ammonia stripper overhead liquid stream in line 224 may also be combined in line 83. The stripper sour water stream in line 107 from the stripper receiver 102 and fractionator sour water stream in line 151 from the fractionator receiver 150 may be combined in line 152. The sour water streams in line 83 and 152 and any more in the refinery may be delivered to the sour water stripper column 190 in a combined sour water line 192. In an embodiment, all of the sour water streams in lines 83 and 152 and any other sour water streams in the refinery 1 are combined in a combined sour water stream in line 192. The combined sour water stream 192 may include the cold separator sour water stream in line 61 from the cold separator 56, the cold flash sour water stream in line 81 from the cold flash drum 78, the stripper sour water stream in line 107 from the stripper receiver 102, fractionator sour water stream in line 151 from the fractionator receiver 150, an ammonia stripper overhead liquid stream in line 224 and any more in the refinery. The combined sour water stream may be cooled, degassed, deoiled and filtered before it is passed to a heat exchanger 194 which heats the combined sour water stream in line 192 and cools an ammonia stripper bottoms stream 196. The heated, combined sour water stream 192 is then sent to the sour water stripper column 190.

The sour water stripper column 190 contains trays or packing that the heated combined sour water stream 192 flows through and around to separate hydrogen sulfide from the heated combined sour water stream 192. A cooled reflux water stream in line 197 which may be a cooled ammonia stripper bottoms stream may be fed to the top of the sour water stripper column 190 to remove heat and suppress evolution of gaseous ammonia in the sour water stripper column. A reboiler acts as a heat exchanger to provide the energy required to provide heat to the column and strip hydrogen sulfide from the combined sour water stream. The resulting sour water stripper overhead stream in a sour water stripper overhead line 198 may be sent to a sour water receiver 206 to substantially remove any entrained droplets and produce a sour gaseous stream rich in hydrogen sulfide in a vapor sour water stripper overhead line 208. The sour gaseous hydrogen sulfide stream in line 208 is dilute in ammonia with less than 2 wt % ammonia and is transported to a sulfur recovery unit (SRU) 310 and/or a thermal oxidizer 320 of the sulfur utilization section 300 in FIG. 2. The sour gaseous stream may contain a very little hydrocarbons since the combined sour water feed in line 192 has been degassed and deoiled. The sour water stripper column 190 may operate at a bottoms temperature of about 150° C. (302° F.) to about 200° C. (392° F.) and an overhead pressure of about 690 kPa (100 psig) to about 1241 kPa (180 psig). A hydrogen sulfide lean stream in a sour water stripper bottoms line 212 contains ammonia and a small concentration of hydrogen sulfide. A portion of the hydrogen sulfide lean stream in line 212 may be reboiled and returned to the sour water stripper column 190 while a net hydrogen sulfide lean stream in line 214 may be sent directly to an ammonia stripper column 210 in line 215. The ammonia stripper column 210 may be a steam re-boiled, refluxed distillation column. In the ammonia stripper column 210, essentially all ammonia and any remaining hydrogen sulfide are removed from the ammonia stripper bottoms stream, which leaves the ammonia stripper column 210 in an ammonia stripper bottoms line 216. A portion of the ammonia stripper bottoms stream in line 216 is taken in the ammonia stripper bottoms stream in line 196 to the heat exchanger 194 to heat the combined sour water stream in line 192 and cool the ammonia stripper bottoms stream in line 196. The heated ammonia stripper bottoms stream in line 196 may provide the cooled reflux water stream in line 197 and a stripped water stream in a net ammonia stripper bottoms line 226. The stripped water stream in line 226 is suitable for many reuses in the refinery 1 such as in the hydroprocessing unit 12, the sulfur utilization unit 300 of FIG. 2 or in a crude desalter or it may be discharged after treatment in a water treatment plant (not shown). In an aspect, the stripped water stream in the net ammonia stripper bottoms line 226 may be used as makeup water for the ammonia scrubber 370, and/or disposed of in the thermal oxidizer 320. The containment levels of hydrogen sulfide and ammonia in the stripped water stream in line 226 may be tailored to individual requirements and are typically about 1 to about 100 ppmw ammonia and about 1 to about 25 ppmw hydrogen sulfide.

In the ammonia stripper column 210, essentially all ammonia and any remaining hydrogen sulfide are removed from the sour water stripper bottoms stream in the stripper feed line 215, which leaves the ammonia stripper column 210 as an ammonia stripper overhead stream in an ammonia stripper overhead line 218. The ammonia stripper overhead stream in line 218 is cooled and sent to an ammonia stripper overhead receiver 220 which separates an ammonia stripper off-gas stream in a vapor ammonia stripper overhead line 222 which can contain up to 12 mol % hydrogen sulfide from an ammonia stripper overhead liquid stream. A portion of the ammonia stripper overhead liquid stream is returned as reflux to the ammonia stripper column 210 and another portion of the ammonia liquid overhead stream in line 224 may be taken for other uses such as diluting the combined sour water stream in line 192 optionally via line 83. A reboiler heats another portion of the ammonia stripper bottoms stream in an ammonia stripper bottoms line 216 to provide the heat required to remove ammonia and any remaining hydrogen sulfide from the ammonia stripper bottoms stream in line 216. The ammonia stripper column 210 may operate at a bottoms temperature of about 100° C. (212° F.) to about 150° C. (302° F.) and an overhead pressure of about 69 kPa (10 psig) to about 207 kPa (30 psig). The ammonia off-gas stream in line 222 is an ammonia-rich gas which is transported to the ammonia scrubber section 370 of the sulfur utilization unit of FIG. 2.

Figure 2:
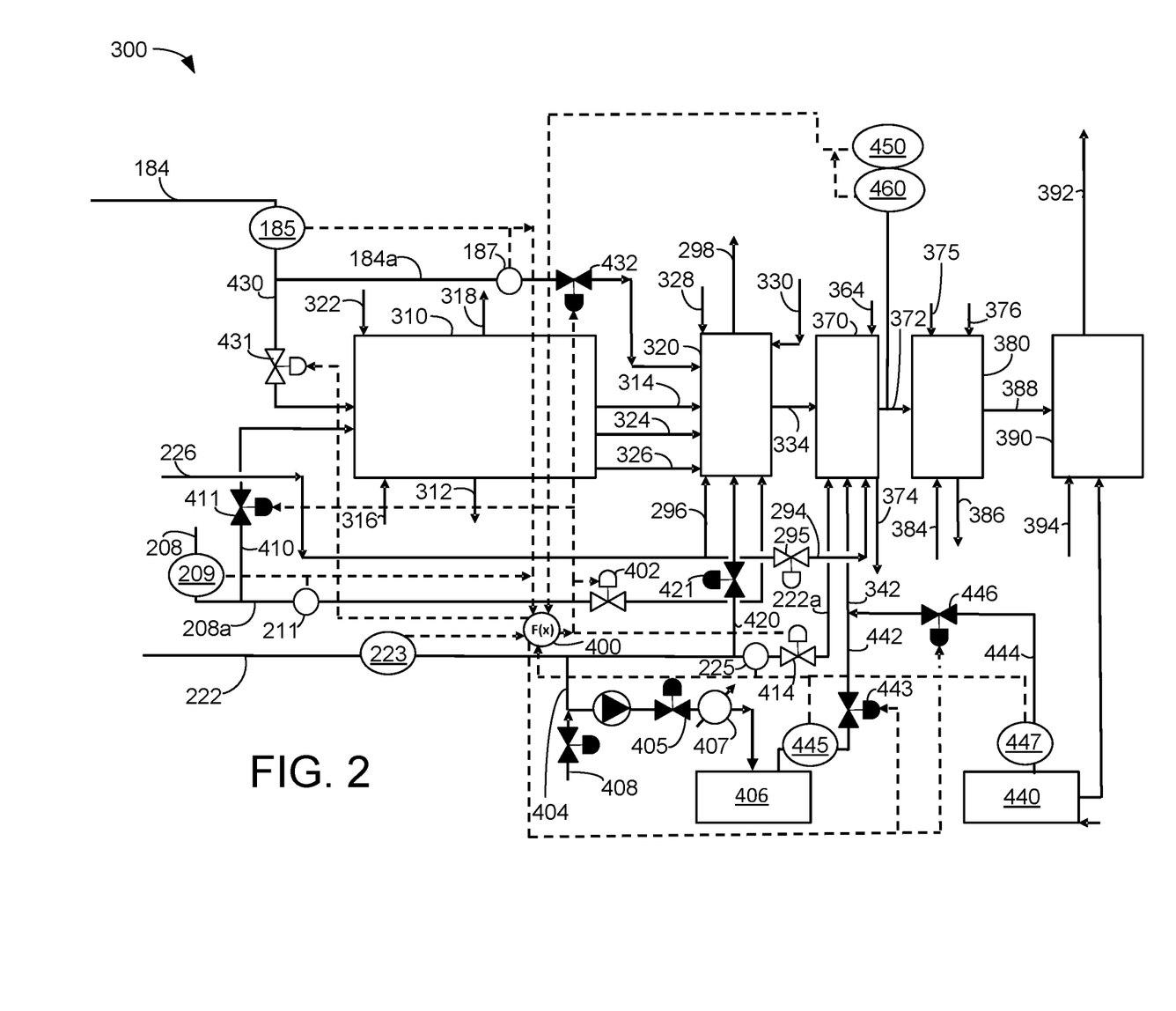
FIG. 2 is a control diagram of sulfur management process and apparatus.

FIG. 2 depicts the sulfur utilization section 300 for processing a hydrogen sulfide stream from the refinery 1 in FIG. 1. Dashed lines in FIG. 2 represent signal lines. The sulfur utilization section comprises a sulfur recovery unit (SRU) 310, a thermal oxidizer 320, an ammonia scrubber 370, a polishing unit 380, and a NOx reduction unit 390, which may include a catalytic VOC combustion section. Their operation will be described in conjunction with the control process and apparatus.

A first line 208 comprising the vapor sour water stripper overhead line in downstream communication with a sour water stripper overhead line 198 charges hydrogen sulfide to the thermal oxidizer 320. The vapor sour water stripper overhead line 208 is in communication with a first hydrogen sulfide analyzer 209. The first hydrogen sulfide analyzer 209 may comprise a hydrogen sulfide concentration analyzer. The first hydrogen sulfide concentration analyzer may determine the molar concentration of hydrogen sulfide in the sour gaseous stream in line 208.

The first line 208 is in upstream communication with the thermal oxidizer 320. A first SRU branch line 410 may divert some of the sour gaseous stream in line 208 through a first branch control valve 411 on the first SRU branch line to the SRU 310. The first branch control valve 411 may be in signal communication with the logic controller 400. The first line 208 includes a net first line 208a with an inlet downstream of the inlet to the first SRU branch line 410. A first control valve 402 on the net first line 208a is in signal communication with the logic controller 400 for controlling the flow rate of the sour gaseous stream in the net first line 208a to the thermal oxidizer 320. The hydrogen sulfide charged to the thermal oxidizer 320 is provided by the sour gaseous stream in the net first line 208a.

The net vapor sour water stripper overhead line 208a is in communication with a first flow indicator transmitter to generate a process signal comprising the molar flow rate of the net sour gaseous stream in the net vapor sour water stripper overhead line 208a charged to the thermal oxidizer 320. The first flow indicator transmitter 211 may determine the molar flow rate of the sour gaseous stream in the net line 208a. The product of the molar concentration of hydrogen sulfide and the molar flow rate of the sour gaseous stream in the first net line 208a provides the molar flow rate of hydrogen sulfide to the thermal oxidizer 320. The first hydrogen sulfide concentration analyzer 209 and the first flow indicator transmitter 211 will send signals to the logic controller 400 which may determine a molar flowrate of hydrogen sulfide for the sour gaseous stream in the first net line 208a. Other control equipment in signal communication with the first hydrogen sulfide analyzer 209, the first indicator controller 211 and the logic controller 400 may conduct calculations to provide the process signal of the hydrogen sulfide molar flow rate to the logic controller 400.

A second line 222 comprising the vapor ammonia stripper overhead line 222 in downstream communication with ammonia stripper overhead line 218 charges ammonia in the ammonia stripper off-gas stream to the ammonia scrubber 370. The vapor ammonia stripper overhead line 222 is in communication with a first ammonia analyzer 223. The first ammonia analyzer 223 may comprise an ammonia concentration analyzer. The ammonia concentration analyzer 223 may determine the molar concentration of ammonia in the ammonia stripper off-gas stream in line 222.

The second line 222 is in upstream communication with the ammonia scrubber 370. A tank storage line 404 may be in downstream communication with the second line 222 and in upstream communication with an ammonia storage tank 406 to divert some of the ammonia stripper off-gas stream in line 222 through a tank control valve 405 on the tank line 404 to an ammonia storage tank 406. Water in line 408 may be added to the ammonia stripper off-gas stream diverted to the storage tank in the tank line 404. A condenser 407 on the tank line 404 condenses the ammonia stripper off-gas stream before entering the ammonia storage tank 406. The tank control valve 405 may be in signal communication with a pressure controller on the ammonia stripper 210. When the pressure controller exceeds a particular pressure, the pressure controller signals the tank control valve 405 to increase the flow rate therethrough to store excess ammonia not required for the ammonia scrubber 370.

An oxidizer diversion line 420 may also be in downstream communication with the second line 222 and in upstream communication with the thermal oxidizer 320 to divert some of the ammonia stripper off-gas stream in the second line 222 through an oxidizer diversion control valve 421 on the oxidizer diversion line 420 to the thermal oxidizer 320 as will be explained hereinafter. A net second line 222a is downstream of the inlet to the tank storage line 404 and the oxidizer diversion line 420. A net second control valve 414 on the net second line 222a controls the flow rate of the net ammonia stripper off-gas stream in the net second line 222a to the ammonia scrubber 370. The ammonia charged to the ammonia scrubber 370 is provided by the ammonia stripper off-gas stream in the net second line 222a.

A second flow indicator transmitter 225 is in communication with the net second line 222a to determine the molar flow rate of the ammonia stripper off-gas stream in the net vapor ammonia stripper overhead line 222a charged to the ammonia scrubber 370. The first ammonia concentration analyzer 223 may determine the molar concentration of ammonia and the second flow indicator transmitter 225 may determine the molar flow rate of the ammonia stripper off-gas stream in the net second line 222a. The product of the molar concentration of ammonia and the molar flow rate of the ammonia stripper off-gas stream in net second line 222a provides the molar flow rate of ammonia. The first ammonia concentration analyzer 223 and the second flow indicator transmitter 225 will send signals to the logic controller 400 which may determine a molar flowrate of ammonia for the stripper off-gas stream in the net second line 222a. Other control equipment in signal communication with the first ammonia analyzer 223, the second indicator controller 225 and the logic controller 400 may conduct calculations to provide the process signal of the ammonia molar flow rate to the logic controller 400.

A third line 184 comprising the vapor solvent overhead line in downstream communication with the solvent regenerator overhead line 174 also may charge hydrogen sulfide in the solvent gaseous stream to the thermal oxidizer 320. The vapor solvent overhead line 184 is in communication with a second hydrogen sulfide analyzer 185. The second hydrogen sulfide analyzer 185 may comprise a hydrogen sulfide concentration analyzer The hydrogen sulfide analyzer 185 may determine the molar concentration of hydrogen sulfide in the solvent gaseous stream in the vapor solvent overhead line 184.

The third line 184 is in upstream communication with the thermal oxidizer 320. A second SRU branch line 430 may typically route the solvent gaseous stream in line 184 through a second branch control valve 431 on the second SRU branch line to the SRU 310. The second branch control valve 431 may be in signal communication with the logic controller 400. The third line 184 includes a net third line 184a with an inlet downstream of the inlet to the second SRU branch line 430. A net third control valve 432 on the net third line 184a is in signal communication with the logic controller 400 for controlling the flow rate of the solvent gaseous stream in the net third line 184a to the thermal oxidizer 320. Some of the hydrogen sulfide charged to the thermal oxidizer 320 is provided by the sour gaseous stream in the net third line 184a.

A third flow indicator transmitter 187 may determine the molar flow rate of hydrogen sulfide in the net vapor solvent overhead line 184a charged to the thermal oxidizer 320. The second hydrogen sulfide concentration analyzer 185 may determine the molar concentration of hydrogen sulfide, and the third flow indicator transmitter 187 may determine the molar flow rate of the solvent gaseous stream in the net third line 184a. The product of the molar concentration of hydrogen sulfide and the molar flow rate of the solvent gaseous stream provides the molar flow rate of hydrogen sulfide. The second hydrogen sulfide concentration analyzer 185 and the third flow indicating transmitter 187 will send signals to the logic controller 400 which may determine a molar flowrate of hydrogen sulfide for the solvent gaseous stream in the net third line 184a. Other control equipment in signal communication with the second hydrogen sulfide analyzer 185, the third flows indicator transmitter 187 and the logic controller 400 may conduct calculations to provide the process signal of the hydrogen sulfide molar flow rate to the logic controller 400.

In normal operation, the sour gaseous stream in the first, vapor sour water stripper overhead line 208 fed to the thermal oxidizer 320 is maximized and all of the solvent gaseous stream in the third, vapor solvent overhead line 184 is fed to the SRU 310. All of the ammonia in the ammonia stripper off-gas stream in the vapor ammonia stripper overhead line 222 is fed to the ammonia scrubber 370.

The logic controller 400 typically allows the ammonia stripper off-gas stream in the second line 222 to flow at full flow rate to the ammonia scrubber 370 and controls the flow rate of the sour gaseous stream in the first line 208 to the thermal oxidizer 320 to provide sulfur in hydrogen sulfide to be stoichiometrically proportional to the ammonia charged to the ammonia scrubber pursuant to applicable chemical reaction of ammonia with sulfur oxide in the ammonia scrubber 370. The logic controller 400 signals the flow rate of hydrogen sulfide to the thermal oxidizer 320 to ensure all of the ammonia is reacted with sulfur oxides fed from the thermal oxidizer 320 to the ammonia scrubber 370 thereby satisfying the stoichiometric molar balance with ammonia in the ammonia scrubber 370. If the first net line 208a provides insufficient hydrogen sulfide to achieve the stoichiometric molar balance in the ammonia scrubber 370, the logic controller 400 can signal the net third control valve 432 to increase the flow rate of the solvent gaseous stream in the net third line 184a to the thermal oxidizer 320. The logic controller 400 would also signal the second branch control valve 431 a corresponding reduction in the flow rate of the solvent gaseous stream through the first SRU branch line 430 to the SRU 310. The stoichiometric molar proportions can be based on a stoichiometric ratio of the applicable reaction or allow for a slight molar excess of sulfur over ammonia such as up to 5 mol % excess of sulfur.

The SRU 310 may operate a process that converts hydrogen sulfide to elemental sulfur. A Claus unit is suitable although a liquid redox sulfur unit, or biological process unit may also be used. The Claus unit combusts hydrogen sulfide to produce elemental sulfur and sulfur dioxide in a combustor at a temperature of about 950° C. to about 1540° C., preferably no more than 1300° C. Air is provided to the SRU 310 in line 322. The combustion effluent is cooled in a boiler to produce high pressure steam. Boiler feed water is provided in line 316 and steam is discharged in line 318. Liquid sulfur will be condensed from the cooled combustion effluent at a temperature ranging from about 310° F. (154° C.) to about 350° F. (176° C.). The remaining gas containing a lower concentration of sulfur will be reheated to a temperature of about 400° F. (204° C.) to about 600° F. (332° C.) to generate more elemental sulfur gas ranging from two to eight sulfur atoms per molecule. The elemental sulfur gas is subsequently condensed by cooling the gas to about 300° F. (149° C.) to about 350° F. (176° C.) and recovering condensed sulfur.

In an embodiment, the uncondensed flue gas may exit from a condenser in the SRU 310 in a tail gas stream in line 314 in route to the thermal oxidizer 320. The uncondensed flue gas bypasses the catalytic reactor without undergoing catalytic conversion of sulfur oxide and hydrogen sulfide to elemental sulfur. The uncondensed flue gas from the condenser may be directly routed to the thermal oxidizer 320 in the tail gas stream in line 314 and the elemental sulfur may exit from the condenser in the SRU 310 as a condensed sulfur product in line 312. Sweep air in line 324 and spent degassing air in line 326 exit the SRU 310 and are fed to the thermal oxidizer 320 and utilized for combustion purposes. The tail gas stream, the sweep air stream and the degassing air stream may all contain sulfur oxides other sulfur species such carbonyl sulfide (COS), carbon disulfide ($CS_2$) and molecular sulfur, $S_6$-$S_8$, and carry them into the thermal oxidizer 320.

The net first, sour gaseous stream in the net first line 208a and the third, net solvent gaseous stream in the net third line 184a comprising hydrogen sulfide are thermally oxidized in the thermal oxidizer 320. A fuel gas stream in line 328 may be supplied to the thermal oxidizer 320. Additionally, the diverted ammonia stripper off-gas stream in line 420 may be diverted to the thermal oxidizer 320 through the diverter control valve 421 which is normally closed to be thermally oxidized. Combustion air is provided in line 330 to the thermal oxidizer 320.

The inlet temperature of the thermal oxidizer 320 is typically in the range of −30° C. to about 500° C. with a pressure of about −1 kPa(g) to about 3000 kPa(g). The outlet temperature is typically in the range of about 600 to about 1300° C. with a pressure of about −1 kPa(g) to about 50 kPa(g). The residence time in the thermal oxidizer 320 is between about 0.5 and about 2 seconds. Any suitable thermal oxidizer 320 could be used, including, but not limited to, an adiabatic thermal oxidizer chamber. The thermal oxidizer 320 can be forced draft, induced draft, or a combination of both.

In the thermal oxidizer 320, hydrocarbons are oxidized to water and carbon dioxide. The hydrogen sulfide and other sulfur compounds in the thermal oxidizer feed are oxidized to sulfur oxide particulates including, but not limited to, $SO_2$ and $SO_3$, and water. The nitrogen from the nitrogen bound molecules which is present in traces from ammonia are converted to nitrogen and NOx, including but not limited to NO, $NO_2$. An optional selective non-catalytic reduction (SNCR) section may be present in the thermal oxidizer 320 in some cases to convert NOx to molecular nitrogen in the event that ammonia or NOx is fed to the thermal oxidizer 320.

A waste heat recovery section may be used in the thermal oxidizer 320 to cool the thermally oxidized flue gas by indirect heat exchange with water or oil. Steam or hot oil may exit the waste heat recovery section of the thermal oxidizer 320 in line 298. A quench water stream in line 296 may be directly injected in the flue gas stream to quench the flue gas stream to further cool it. For example, quench water may be provided in line 296 from the stripped water stream in the net ammonia stripper bottoms line 226 from the ammonia stripping column 210 in the refinery of FIG. 1.

A flue gas stream in a flue gas line 334 exiting from the thermal oxidizer 320 comprises sulfur oxides (i.e., $SO_2$ and $SO_3$) and one or more of $H_2O$, $CO_2$, $N_2$, $O_2$, and NOx (i.e., NO and $NO_2$). The cooled flue gas stream comprising sulfur oxides in line 334 from the quench section of the thermal oxidizer 320 is sent to an ammonia scrubber 370 for removal of sulfur oxides by reacting them with ammonia. The inlet temperature of the ammonia scrubber section 370 is typically in the range of about 45 to about 300° C. with a pressure of about −4 kPa(g) to about 50 kPa(g). The outlet temperature is typically in the range of about 45 to about 150° C. with the same pressure range. In the ammonia scrubber 370, an aqueous ammonia is contacted with the sulfur oxide in the flue gas stream in line 334. The ammonia stripper off-gas stream from the net ammonia stripper overhead line 222a may be injected into an ammonia vapor off-gas scrubber sump in the ammonia scrubber 370. From this sump, an aqueous liquid recycle may be countercurrently contacted with the flue gas stream in line 334 by injection such as from a multi-level spray header. The sump is supplied by water in line 294 through a control valve 295 thereon from the stripped water stream in the net ammonia stripper bottoms line 226 from the ammonia stripper column 210.

In an aspect, the ammonia stripper off-gas stream in the net second line 222a from the ammonia stripper column 210 in the refinery 1 of FIG. 1 provides ammonia to the ammonia scrubber 370. Supplemental ammonia may be provided from the ammonia storage tank 406 or from a chemical grade ammonia tank 440 in a supplemental ammonia line 342.

An ammonia storage line 442 provides aqueous ammonia from the ammonia storage tank 406 through an ammonia storage control valve 443. A ammonia storage analyzer 445 in communication with said ammonia storage line 442 may comprise a combination of a second ammonia concentration analyzer and a fourth flow indicator transmitter to generate a process signal comprising the molar flow rate of ammonia in the storage ammonia line 442 charged to the ammonia scrubber 370 in the supplemental ammonia line 342. The second ammonia analyzer may determine the molar concentration of ammonia, and the fourth flow indicator transmitter may be used to determine the molar flow rate of the ammonia storage stream in line 442. The product of the molar concentration of ammonia and the molar flow rate of the ammonia storage stream in line 442 provides the molar flow rate of ammonia in the ammonia storage line 442. The second ammonia concentration analyzer and the fourth flow indicating transmitter will send signals to the logic controller 400 which may determine a molar flowrate of ammonia for the ammonia storage stream from the ammonia storage line 442.

A chemical storage line 444 provides chemical grade aqueous ammonia from the chemical grade ammonia storage tank 440 through an ammonia chemical control valve 446. A third ammonia analyzer 447 in communication with said chemical storage line 444 may comprise a combination of a third ammonia molar concentration analyzer and a fifth flow indicator transmitter to generate a process signal comprising the molar flow rate of ammonia in the chemical storage line 444 charged to the ammonia scrubber 370 in the supplemental ammonia line 342. The third ammonia analyzer 447 may determine the molar concentration of ammonia and the fifth flow indicator transmitter may be used to determine the molar flow rate of the chemical storage stream in line 444. The product of the molar concentration of ammonia and the molar flow rate of the chemical storage stream in line 444 provides the molar flow rate of ammonia. The third ammonia concentration analyzer and the fifth flow indicating transmitter will send signals to the logic controller 400 which may determine a molar flow rate of ammonia for the chemical storage line 444.

In the ammonia scrubber 370, a two-step reaction occurs. In the first step, the ammonia reacts with the $SO_2$ and water to produce ammonium sulfite, $(NH_4)_2SO_3$ as in Formula (1):

$$SO_2 + 2NH_3 + H_2O \rightarrow (NH_4)_2SO_3 \qquad (1).$$

In the second step, the produced ammonium sulfite then reacts with oxygen to produce ammonium sulfate, $(NH_4)_2SO_4$ as in Formula (2):

$$(NH_4)_2SO_3 + \tfrac{1}{2}O_2 \rightarrow (NH_4)_2SO_4 \qquad (2).$$

An aeration air stream in line 364 may also be added to the ammonia scrubber 370 to provide aeration in the scrubber and oxygen requirements to promote formation of ammonia sulfate. To achieve the production of ammonium sulfate, two moles of ammonia is required for every mole of sulfur. Hence, the logic controller 400 will control flow the molar flow rate of hydrogen sulfide in the net first line 208a and the third net line 184a to the thermal oxidizer 320 to ensure that all ammonia in the second line 222a charged to the ammonia scrubber 370 will be reacted. To achieve the reaction of Formula 1, the flow rate in the net first line 208a through the first control valve 402 and in the net third line 184a through the third control valve 432 will be controlled to provide about half the molar flow rate of hydrogen sulfide as the molar flow rate of ammonia through the second control valve 414 through the net second line 222a.

An alternative reaction can be conducted in the ammonia scrubber 370 to produce ammonium thiosulfate having an overall reaction shown in Formula (3):

$$6NH_3 + 4SO_2 + 2H_2S + H_2O \rightarrow 3(NH_4)_2S_2O_3 \qquad (3).$$

This reaction requires an intermediate product, diammonium sulfite to be reacted with hydrogen sulfide which can be diverted from the net first line 222a to the ammonium thiosulfate reactor. The molar proportions will still be controlled to meet the stoichiometric molar balance of Formula (3). To achieve the reaction of Formula 3, the flow rate in the net first line 208a through the first control valve 402 and in the net third line 184a through the third control valve 432 will be controlled to provide about the same molar flow rate of hydrogen sulfide as the molar flow rate of ammonia through the second control valve 414 through the net second line 222a. An aqueous chemical such as an ammonium sulfate or ammonium thiosulfate product stream may depart the ammonia scrubber 370 in line 374 for further processing.

A scrubbed flue gas stream in a scrubber exit line 372 from the ammonia scrubber 370 has a reduced level of sulfur oxides and is fed to a polishing unit 380 to remove residual sulfur compounds. The scrubber exit line may be an overhead line from the ammonia scrubber which is lean in sulfur oxides. In the polishing unit 380, carry over hydrogen sulfide from the stripper off-gas stream in the second line 222 from the ammonia stripping column 210 used in the ammonia scrubber 370 and any unreacted sulfur oxides in the scrubbed flue gas stream in the scrubber exit line 372 may be managed by reacting it with an oxidation media in line 375. Alternatively, a second thermal oxidizer may be used to convert hydrogen sulfide to sulfur oxides.

Oxidation media may include hydrogen peroxide, $H_2O_2$; mixed with water in line 375. The inlet temperature to the polishing unit 380 is typically in the range of about 45 to about 150° C. and a pressure of about −4 kPa(g) to about 50 kPa(g). The oxidation media reacts with remaining hydrogen sulfide to produce $S^0$, $SO_2$, $SO_3$ and water.

Alternatively, fuel gas and combustion air are fed to the polishing unit in line 376 to combust hydrogen sulfide to sulfur oxides. The flue gas from the combustion may be cooled by heat recovery and quenching with the combustion air stream which may serve to preheat the combustion air.

An alkaline stream comprising sodium or potassium hydroxide, sodium bicarbonate, $NaHCO_3$ or liquid ammonia in line 384 may also added to an alkaline scrubbing section of the polishing unit 380 to convert sulfur oxides to $(NH_4)_2SO_3$, $(NH_4)_2SO_4$, $Na_2SO_3$, $Na_2SO_4$, $K_2SO_3$, $K_2SO_4$ and water which are removed in a brine or fertilizer effluent stream in line 386. An air stream may be fed to the polishing unit 380 to produce necessary chemicals or reduce chemical oxygen demand. If thermal oxidation is used in the polishing unit to remove residual hydrogen sulfide, the resulting sulfur oxides removal will be conducted in the gas phase to produce a dry scrubbing product.

The polished flue gas stream comprises water, nitrogen, oxygen and carbon dioxide and may be exhausted to atmosphere in line 388 because it is sufficiently clean to meet environmental emission regulations. However, if NOx is present or if volatile organic compounds (VOC) are present in excess of environmental limits in the polished flue gas stream exiting the polishing unit 380 in line 388 it may be fed to a NOx reduction unit 390 to remove remnant NOx. The inlet temperature of the NOx reduction unit 390 is typically in the range of about 150 to about 300° C. with a pressure of about −5 kPa(g) to about 50 kPa(g). The outlet temperature is typically in the range of about 200 to about 350° C. with the same pressure range. The polished flue gas stream in line 388 may need to be heated to obtain the desired inlet temperature for the NOx reduction unit 390. The NOx reduction unit 390 can react ammonia from an ammonia stream in line 394 with NOx to produce molecular nitrogen and water. The ammonia stream in line 394 may be taken from the chemical grade ammonia tank 440, but it may be taken from the stored ammonia tank 406.

Any suitable NOx reduction catalyst can be used, including but not limited to, a ceramic, carrier material such as titanium oxide with active catalytic components such as oxides of base metals including $TiO_2$, $WO_3$ and $V_2O_5$, or an activated carbon-based catalyst. Additionally, an additional bed of catalyst for combusting VOC's may also be employed in the NOx reduction unit 390. A noble metal supported on an alumina may be used for combusting VOC's. The NOx reduced outlet flue gas stream 392 comprises one or more of water, carbon dioxide, oxygen and molecular nitrogen which can be vented to the atmosphere in line 392.

The scrubber exit line 372 is in downstream communication with the ammonia scrubber 370. The scrubber flue gas stream in the scrubber exit line 372 exiting the ammonia scrubber 370 should have very little sulfur oxide concentration. The scrubber exit line 372 is in communication with a sulfur oxide analyzer 450. The sulfur oxide analyzer 450 may comprise a of a sulfur oxide concentration analyzer. The sulfur oxide concentration analyzer may determine the concentration of only sulfur dioxide or both sulfur dioxide and sulfur trioxide for the sulfur oxide concentration. The sulfur oxide analyzer 450 may determine the molar concentration of sulfur oxide. The sulfur oxide analyzer may send a signal of the sulfur oxide molar concentration to the logic controller 400 for the scrubbed flue gas stream in the scrubbed flue gas line 372. Other control equipment in signal communication with the sulfur oxide analyzer 450 and the logic controller 400 may conduct calculations to provide the process signal of the sulfur oxide concentration to the logic controller 400.

The scrubber exit line 372 may also be in communication with a fourth ammonia analyzer 460. The fourth ammonia analyzer 450 may comprise an ammonia concentration analyzer. The ammonia analyzer 460 may determine the molar concentration of ammonia in the scrubbed flue gas stream in the scrubber exit line 372 exiting the ammonia scrubber 370. The fourth ammonia analyzer may send a signal to the logic controller 400 of the ammonia concentration in the scrubbed flue gas stream in line 372. Other control equipment in signal communication with the scrubber ammonia analyzer 460 and the logic controller 400 may conduct calculations to provide the process signal of the ammonia molar flow rate in the scrubber exit line 372 to the logic controller 400.

If the process signal from the sulfur oxide analyzer 450 indicates a sulfur oxide concentration above a predetermined concentration, such as from 0 to 5 mol % of the scrubbed flue gas stream, or if the scrubber ammonia analyzer 460 indicates an ammonia concentration below a predetermined concentration, such as from 0 to 5 mol % of the scrubbed flue gas stream, the logic controller 400 will signal the following adjustments.

The logic controller 400 will signal to adjust the flow rate of hydrogen sulfide to the thermal oxidizer 320. The logic controller 400 will first signal the net third control valve 432 on the net third line 184a to reduce the flow rate to the thermal oxidizer 320 if the third control valve 432 is open. The logic controller 400 will also signal the second branch control valve 431 on the second SRU branch line to open proportionally more to divert the flow of the solvent gaseous stream to the SRU 310. If the third control valve 432 was closed to a minimum flow rate in the adjustment, the logic controller 400 will secondly signal the first control valve 402 on the net first line 208a to reduce the flow rate to the thermal oxidizer 310. The logic controller 400 will also signal the first branch control valve 411 on the first SRU branch line 410 to open more proportionally to divert the flow of the sour gaseous stream to the SRU 310.

If the net first control valve 402 and the net third control valve 432 are both at their minimum setting, the logic controller 400 may then signal the ammonia storage control valve 443 to open more to increase the flow rate of the ammonia storage in line 442 from the ammonia storage tank 406 to the ammonia scrubber through the supplemental ammonia line 342 to ensure sufficient ammonia is present to react with all the sulfur oxide in the ammonia scrubber 370. The tank ammonia analyzer 445 signals the logic controller 400 the molar flow rate of ammonia in the ammonia storage line 442 to enable the logic controller to signal the proper flow rate through the ammonia storage control valve 443.

If more ammonia is needed to bring the sulfur oxide concentration to below the predetermined setting or to bring the ammonia concentration above the predetermined setting and the height of the level in the ammonia storage tank 406 is below a predetermined level, the logic controller 400 may signal the ammonia chemical control valve 446 to open more to increase the flow rate of the chemical ammonia in line 444 from the chemical ammonia tank 440 through the supplemental ammonia line 342 to the ammonia scrubber 370 to ensure sufficient ammonia is charged to the ammonia scrubber to react with the sulfur oxide. The chemical ammonia analyzer 447 signals the logic controller 400 the molar flow rate of ammonia in the chemical ammonia line 444 to enable the logic controller 400 to signal the proper flow rate to the ammonia chemical control valve 446.

If the process signal from the sulfur oxide analyzer 450 indicates a sulfur oxide concentration below a predetermined concentration, such as from 0 to 5 mol % of the scrubbed flue gas stream, or if the scrubber ammonia analyzer 460 indicates an ammonia concentration above a predetermined concentration, such as from 0 to 5 mol % of the scrubbed flue gas stream, the logic controller 400 will signal the following adjustments.

If the ammonia chemical control valve 446 is open, the logic controller 400 may signal the ammonia chemical control valve 446 to open less to decrease the flow rate of the chemical ammonia in line 444 from the chemical ammonia tank 440 to the ammonia scrubber 370 in supplemental ammonia line 342 to avoid importing excess ammonia into the ammonia scrubber 370. The chemical ammonia analyzer 447 signals the logic controller 400 the molar flow rate of ammonia in the chemical ammonia line 444 to enable it to signal the proper flow rate through the ammonia chemical control valve 446.

If the ammonia chemical control valve 446 is completely closed or was closed in the adjustment, but the ammonia storage control valve 443 is open, and the sulfur oxide level in the scrubbed flue gas stream in line 372 is still below the set point or the ammonia concentration in the scrubbed flue gas stream is above the set point, the logic controller 400 may secondly signal the ammonia storage control valve 443 to further close to further decrease the flow rate of ammonia through the ammonia storage line 442 to the ammonia scrubber 370 to increase the sulfur oxide concentration or reduce the ammonia concentration in the scrubbed flue gas stream exiting the ammonia scrubber 370. The ammonia storage analyzer 445 signals the logic controller 400 the molar flow rate of ammonia in the storage 442 ammonia line to enable it to signal the proper flow rate through the ammonia storage control valve 443. If the liquid level in the ammonia storage tank 406 is above a predetermined height, the logic controller 400 may skip the step of closing the ammonia storage control valve 443.

If the storage control valve 443 and the chemical control valve 446 are both closed or the liquid level in the ammonia storage tank 406 is above a predetermined height, but the sulfur oxide concentration in the scrubbed flue gas stream in line 372 is still below the set point or the ammonia concentration in the scrubbed flue gas stream is above the set point, the logic controller 400 may adjust or increase the flow rate of hydrogen sulfide to the thermal oxidizer 320.

To increase the flow rate of hydrogen sulfide to the thermal oxidizer 320, the logic controller 400 will first signal the net first control valve 402 on the net first line 208a to increase the flow rate of the sour gaseous stream to the thermal oxidizer 320. The logic controller 400 will also signal the first branch control valve 411 on the first SRU branch line 410 to close more proportionally if open to divert less of the flow of the sour gaseous stream to the SRU 310. If the first control valve 402 was at its maximum flow rate or is opened to the maximum flow rate in the adjustment, the logic controller 400 will secondly signal the net third control valve 432 on the net third line 184a to increase the flow rate to the thermal oxidizer 310. The logic controller 400 will also signal the second branch control valve 431 on the second SRU branch line 410 to close more proportionally to divert less of the flow of the solvent gaseous stream to the SRU 310.

If the net third control valve 432 is on its maximum setting, the logic controller 410 may signal the storage control valve 443 to further close to further decrease the flow rate of ammonia through the ammonia storage line 442 to the ammonia scrubber 370 to increase the sulfur oxide concentration or reduce the ammonia concentration in the scrubbed flue gas stream exiting the ammonia scrubber 370 in line 372. The ammonia storage analyzer 445 signals the logic controller 400 the molar flow rate of ammonia in the ammonia storage line 442 to enable it to signal the proper flow rate through the ammonia storage control valve 443.

If sulfur oxide concentration is still below the set point or the ammonia concentration is still above its set point in the scrubber exit line 372, the flow rate of the ammonia stripper off-gas stream in the net second line 222a will be reduced. To do so, the logic controller 400 will signal the tank control valve 405 to open proportionally to allow the ammonia stripper off-gas stream in the second line 222 to flow in the tank storage line 404, mix with water from line 408, condense in cooler 407 and enter to the storage tank 406.

If a liquid level in the storage tank 406 reaches a maximum height, a level switch will close the control valve 405 and open the control valve 421 to allow the ammonia stripper off-gas stream in the second line 222 to flow in the thermal oxidizer diversion line 420 and flow into the thermal oxidizer 320 in which the ammonia will combusted.

If the process signal from the scrubber ammonia analyzer 460 still indicates ammonia concentration is above a predetermined set point or the sulfur oxide concentration is below its set point, the ammonia stripper off-gas stream may be routed to flare.

The foregoing control process and apparatus provides feed forward control of stoichiometric proportions of hydrogen sulfide and ammonia to the thermal oxidizer 320 and ammonia scrubber 370, respectively. Because sulfur may enter the thermal oxidizer 320 unmeasured in lines 314, 324, 326 and to account for any miscalculation of molar flow rates, a feed back measurement of sulfur dioxide and ammonia can be used to correct the flow rate of hydrogen sulfide to the thermal oxidizer 320 and/or ammonia to the ammonia scrubber 370.

SPECIFIC EMBODIMENTS

While the following is described in conjunction with specific embodiments, it will be understood that this description is intended to illustrate and not limit the scope of the preceding description and the appended claims.

A first embodiment of the disclosure is a process for controlling feed rates in a facility comprising determining the molar flow rate of hydrogen sulfide charged to a thermal oxidizer; determining the molar flow rate of ammonia charged to an ammonia scrubber; controlling the flow rate of hydrogen sulfide to the thermal oxidizer and the flow rate of ammonia to the ammonia scrubber to provide stoichiometric molar proportions for a chemical reaction between ammonia and sulfur dioxide. An embodiment of the disclosure is one, any or all of prior embodiments in this paragraph up through the first embodiment in this paragraph wherein the sulfur charged to the thermal oxidizer is provided by a sour gaseous stream. An embodiment of the disclosure is one, any or all of prior embodiments in this paragraph up through the first embodiment in this paragraph further comprising determining the concentration of sulfur oxide or ammonia in a stream exiting the ammonia scrubber and adjusting the flow rate of hydrogen sulfide in the sour gaseous stream and/or a solvent gaseous stream to the thermal oxidizer or adjusting the flow rate of ammonia to the ammonia scrubber in response to the determination of the concentration of sulfur oxide in the flue gas stream. An embodiment of the disclosure is one, any or all of prior embodiments in this paragraph up through the first embodiment in this paragraph further comprising increasing the flow rate of the sour gaseous stream before increasing the flow rate of the solvent gaseous stream in response to the determination of the concentration of sulfur oxide in the flue gas stream. An embodiment of the disclosure is one, any or all of prior embodiments in this paragraph up through the first embodiment in this paragraph wherein the ammonia charged to the ammonia scrubber is provided by an ammonia stripper off-gas stream and/or an ammonia storage stream. An embodiment of the disclosure is one, any or all of prior embodiments in this paragraph up through the first embodiment in this paragraph further comprising adjusting the flow rate of ammonia to the ammonia scrubber comprises decreasing the flow rate of the ammonia storage stream to the ammonia scrubber. An embodiment of the disclosure is one, any or all of prior embodiments in this paragraph up through the first embodiment in this paragraph further comprising diverting the ammonia stripper off-gas stream to an ammonia storage tank and/or to the thermal oxidizer to decrease the flow rate of ammonia to the ammonia scrubber. An embodiment of the disclosure is one, any or all of prior embodiments in this paragraph up through the first embodiment in this paragraph wherein the solvent gaseous stream and/or the sour gaseous stream is charged to a sulfur recovery unit, tail gas from the sulfur recovery unit is charged to the thermal oxidizer and flue gas from the thermal oxidizer is charged to the ammonia scrubber. An embodiment of the disclosure is one, any or all of prior embodiments in this paragraph up through the first embodiment in this paragraph wherein determining the molar flow rate of sulfur charged to a thermal oxidizer comprises determining the concentration of hydrogen sulfide in the sour gaseous stream and determining the concentration of hydrogen sulfide in the solvent gaseous stream. An embodiment of the disclosure is one, any or all of prior embodiments in this paragraph up through the first embodiment in this paragraph wherein determining the flow rate of ammonia charged to the ammonia scrubber comprises determining the concentration of ammonia in the ammonia stripper off-gas stream.

A second embodiment of the disclosure is an apparatus for controlling feed rates in a facility comprising a first hydrogen sulfide analyzer for determining the concentration of hydrogen sulfide in a first line in upstream fluid communication with a thermal oxidizer; an ammonia analyzer for determining the concentration of ammonia in a second line in upstream fluid communication with an ammonia scrubber; a logic controller in signal communication with the first hydrogen sulfide analyzer and the ammonia analyzer; a first control valve in signal communication with the logic controller for controlling the flow rate in the first line to the thermal oxidizer. An embodiment of the disclosure is one, any or all of prior embodiments in this paragraph up through the second embodiment in this paragraph further comprising a second hydrogen sulfide analyzer for determining the concentration of sulfur in a third line in upstream fluid communication with a thermal oxidizer, the logic controller in signal communication with the second hydrogen sulfide analyzer, and a third control valve in signal communication with the logic controller for controlling the flow rate in the third line to the thermal oxidizer. An embodiment of the disclosure is one, any or all of prior embodiments in this paragraph up through the second embodiment in this paragraph wherein the first line is in downstream communication with a sour water stripper overhead line and the third line is in downstream communication with an amine regenerator column overhead line. An embodiment of the disclosure is one, any or all of prior embodiments in this paragraph up through the second embodiment in this paragraph further comprising a sulfur oxide analyzer for determining the concentration of sulfur oxide in a line from the ammonia scrubber, the logic controller in signal communication with the scrubber sulfur dioxide analyzer for adjusting the flow rates through the first control valve on the first line and the third control valve on the third line. An embodiment of the disclosure is one, any or all of prior embodiments in this paragraph up through the second embodiment in this paragraph further comprising a scrubber ammonia analyzer for determining the concentration of ammonia in a line from the ammonia scrubber, the logic controller in signal communication with the scrubber ammonia analyzer for adjusting the flow rates through the first control valve on the first line and/or the third control valve on the third line. An embodiment of the disclosure is one, any or all of prior embodiments in this paragraph up through the second embodiment in this paragraph wherein the second line is in downstream fluid communication with an overhead line of an ammonia stripper column. An embodiment of the disclosure is one, any or all of prior embodiments in this paragraph up through the second embodiment in this paragraph further comprising a tank storage line in downstream communication with the second line and in upstream communication with an ammonia storage tank and a control valve on the tank storage line in signal communication with the logic controller for diverting ammonia to the ammonia storage tank in response to the determination of the concentration of ammonia in the scrubber ammonia analyzer. An embodiment of the disclosure is one, any or all of prior embodiments in this paragraph up through the second embodiment in this paragraph further comprising an oxidizer diversion line in downstream fluid communication with the second line and in upstream communication with the thermal oxidizer and a control valve on the thermal oxidizer ammonia line for diverting ammonia to the thermal oxidizer in response to the determination of the concentration of ammonia in the scrubber ammonia analyzer. An embodiment of the disclosure is one, any or all of prior embodiments in this paragraph up through the second embodiment in this paragraph wherein a sulfur recovery unit is in downstream communication with an overhead line of the sour water stripper and/or an overhead line of the solvent regenerator, the thermal oxidizer is in downstream communication with the sulfur recovery unit and the ammonia scrubber is in downstream communication with the thermal oxidizer.

A third embodiment of the disclosure is a process for controlling feed rates in a facility comprising determining the concentration of sulfur oxide or ammonia in an overhead stream exiting an ammonia scrubber; adjusting the flow rate of hydrogen sulfide in a sour gaseous stream and/or a solvent gaseous stream to a thermal oxidizer and/or adjusting the flow rate of ammonia to the ammonia scrubber in response to the determination of the concentration of hydrogen sulfide or ammonia exiting an ammonia scrubber.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for controlling feed rates in a facility comprising:
   determining the molar flow rate of hydrogen sulfide charged to a thermal oxidizer;
   determining the molar flow rate of ammonia charged to an ammonia scrubber;
   determining a concentration of sulfur oxide or ammonia in a stream exiting the ammonia scrubber and adjusting the flow rate of hydrogen sulfide in a sour gaseous stream and/or a solvent gaseous stream to the thermal oxidizer in response to the determination of the concentration of sulfur oxide in a flue gas stream;
   increasing the flow rate of the sour gaseous stream before increasing the flow rate of the solvent gaseous stream in response to the determination of the concentration of sulfur oxide in the flue gas stream; and
   controlling the flow rate of hydrogen sulfide to the thermal oxidizer and the flow rate of ammonia to the ammonia scrubber to provide stoichiometric molar proportions for a chemical reaction between ammonia and sulfur dioxide.

2. The process of claim 1 wherein the sulfur charged to the thermal oxidizer is provided by said sour gaseous stream.

3. The process of claim 1 further comprising determining the concentration of sulfur oxide or ammonia in a stream exiting the ammonia scrubber and adjusting the flow rate of ammonia to said ammonia scrubber in response to the determination of the concentration of sulfur oxide in the flue gas stream.

4. The process of claim 3 wherein the ammonia charged to said ammonia scrubber is provided by an ammonia stripper off-gas stream and/or an ammonia storage stream.

5. The process of claim 4 further comprising adjusting the flow rate of ammonia to the ammonia scrubber comprises decreasing the flow rate of the ammonia storage stream to the ammonia scrubber.

6. The process of claim 5 further comprising diverting the ammonia stripper off-gas stream to an ammonia storage tank and/or to the thermal oxidizer to decrease the flow rate of ammonia to the ammonia scrubber.

7. The process of claim 1 wherein said solvent gaseous stream and/or said sour gaseous stream is charged to a sulfur recovery unit, tail gas from said sulfur recovery unit is charged to said thermal oxidizer and flue gas from said thermal oxidizer is charged to said ammonia scrubber.

8. The process of claim 1 wherein determining the molar flow rate of sulfur charged to a thermal oxidizer comprises determining the concentration of hydrogen sulfide in the sour gaseous stream and determining the concentration of hydrogen sulfide in the solvent gaseous stream.

9. The process of claim 1 wherein determining the flow rate of ammonia charged to the ammonia scrubber comprises determining the concentration of ammonia in the ammonia stripper off-gas stream.

* * * * *